United States Patent [19] [11] 3,982,854
Berry et al. [45] Sept. 28, 1976

[54] FRICTION WELDED METALLIC TURBOMACHINERY BLADE ELEMENT

[75] Inventors: Thomas F. Berry, Greenhills; Ronald G. Rajala, Loveland, both of Ohio; Harold L. Mullins, Hebron, Ky.

[73] Assignee: General Electric Company, Cincinnati, Ohio

[22] Filed: June 18, 1973

[21] Appl. No.: 370,702

Related U.S. Application Data

[62] Division of Ser. No. 209,596, Dec. 20, 1971, Pat. No. 3,768,147.

[52] U.S. Cl. ............. 416/213 R; 416/241 R
[51] Int. Cl. .......................... F01d 5/28
[58] Field of Search .................. 416/241, 213

[56] References Cited
UNITED STATES PATENTS

| | | | |
|---|---|---|---|
| 2,431,660 | 11/1947 | Gaudenzi | 416/241 |
| 2,749,029 | 6/1956 | Goetzel et al. | 416/241 |
| 2,767,460 | 10/1956 | Schultz | 416/213 X |
| 2,807,435 | 9/1957 | Howlett et al. | 416/241 |
| 2,888,239 | 5/1959 | Slemmons | 416/213 |
| 3,394,918 | 7/1968 | Wiseman | 416/241 |
| 3,549,273 | 12/1970 | Bird et al. | 416/241 |
| 3,700,348 | 10/1972 | Corsmeier et al. | 416/95 X |
| 3,768,147 | 10/1973 | Berry et al. | 416/241 X |

FOREIGN PATENTS OR APPLICATIONS

| | | | |
|---|---|---|---|
| 1,426,849 | 4/1969 | Germany | 416/213 |
| 648,234 | 1/1951 | United Kingdom | 416/213 |

Primary Examiner—Everette A. Powell, Jr.
Attorney, Agent, or Firm—Lee H. Sachs; Derek P. Lawrence

[57] ABSTRACT

A friction welded metallic article such as a fluid directing element for turbomachinery apparatus has a cast airfoil and a wrought base joined by friction welding. One such article having a hollow interior portion is made from a hollow or cored casting and a wrought base member. There is provided a metal airfoil casting having a hollow interior portion and an enlarged foot including an interface portion. Also provided is a wrought metal base portion including an interface portion. Interface surfaces of the interface portions are placed in spaced apart opposed relationship and then the airfoil casting and the wrought base member are friction welded at their interface portions.

6 Claims, 6 Drawing Figures

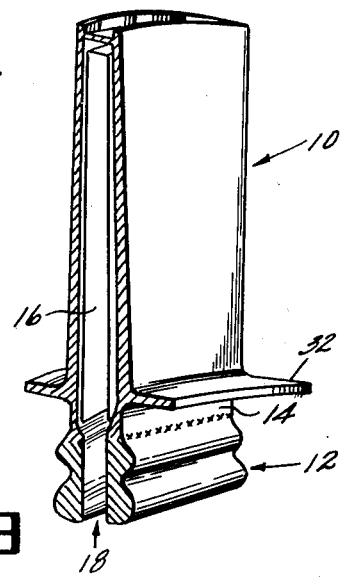
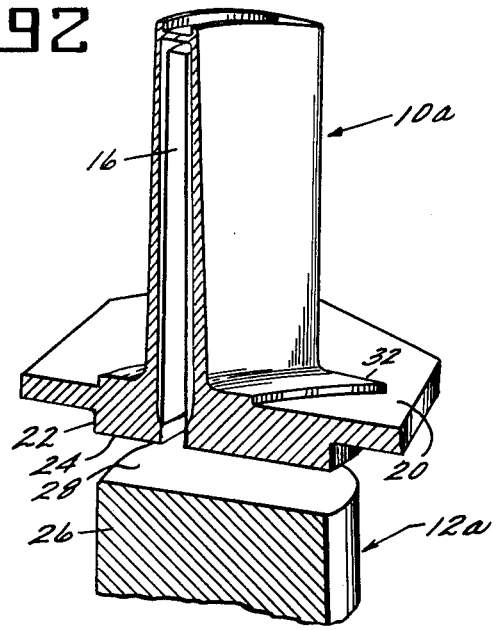
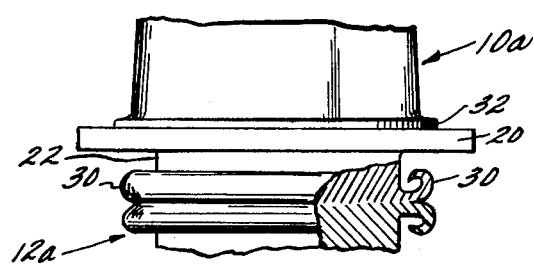
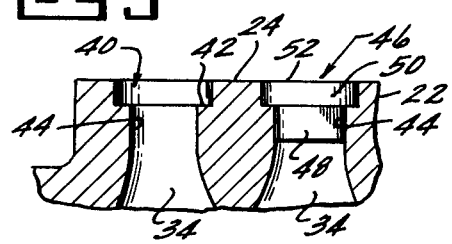
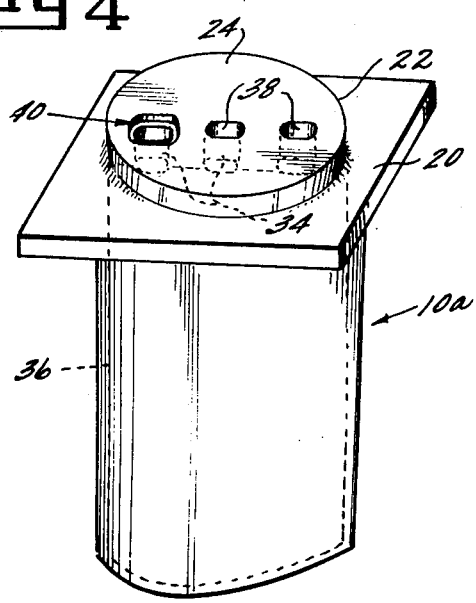
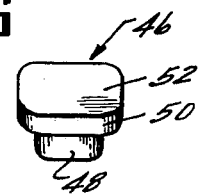

FRICTION WELDED METALLIC TURBOMACHINERY BLADE ELEMENT

This is a divisional application of application Ser. No. 209,596 filed Dec. 20, 1971 now U.S. Pat. No. 3,768,147 issued Oct. 30, 1973 and assigned to the assignee of the present invention.

BACKGROUND OF THE INVENTION

Conventional turbine blades for turbomachinery apparatus usually are of a single alloy configuration, generally cast, with the alloy selected to meet certain high temperature strength and environmental requirements. Strength in the dovetail region of such a fluid directing element is dictated by the low temperature strength of the alloy. In high tip speed turbomachinery, very high centrifugal loads must be transferred from the blade dovetail to the wheel dovetail in which it is mounted at the interface between the two. Thus, the life of the blade dovetail is limited by low cycle fatigue whereas the mating wheel dovetail, which can be a lower temperature material, generally possesses extremely high cyclic capability.

As the turbine temperatures and speeds are increased in advanced gas turbines to improve efficiency, it has become increasingly more difficult to satisfy all of the requirements of such components involved.

SUMMARY OF THE INVENTION

It is a principal object of the present invention to provide a method for making a metallic fluid directing element for turbomachinery, including a hollow inner portion, by joining through the method of friction welding a metal airfoil casting having good high temperature creep and rupture strengths and good environmental and low cycle fatigue resistance with a wrought base portion having high tensile and creep strength along with good low cycle fatigue resistance at a lower operating temperature.

A further object is to provide such an element having a cast airfoil structure and a wrought base structure joined by a friction weld.

Another object is to provide such a method in which an insert liner can be secured within the hollow interior of the cast airfoil as a result of friction welding the airfoil to the base portion.

Still another object is to provide a method for avoiding migration of the flash resulting from friction welding into the hollow interior of the airfoil.

These and other objects and advantages will be more fully understood from the following detailed description, examples and the drawing, all of which are intended to be typical of rather than limiting on the scope of the present invention.

One form of the present invention, in a method for making a fluid directing element for turbomachinery, particularly a turbine blade which may have a hollow interior portion, includes providing a metal airfoil casting or powder metal consolidation and an enlarged foot. The foot includes an interface portion which has an interface surface. In addition, there is provided a wrought metal base portion which also has an interface portion including an interface surface. The interface surfaces are positioned in opposed spaced apart relationship after which such components are friction welded at their interface portions.

In another form, a liner insert is placed within the hollow interior of the airfoil prior to friction welding. Such liner can be secured within the hollow interior during friction welding.

In still another form in which the hollow inner portion is open through a passage in its interface surface, there is provided a specifically shaped recess around and connected with such passage. A plug, having an enlarged head shaped to match the recess and having a shank attached to the head and shaped to match the passage, is positioned within the recess.

The article of the present invention comprises an airfoil having a cast alloy structure and a base having a wrought alloy structure, the airfoil and base being joined at a friction weld characterized by a solid state, forged, non-fusion bond structure with a narrow heat affected zone.

BRIEF DESCRIPTION OF THE DRAWING

FIG. 1 is a diagrammatic, sectional view of a turbine blade made in accordance with the present invention;

FIG. 2 is a diagrammatic, sectional view of a cast airfoil preform in spaced apart opposed relationship with a wrought metal base portion prior to friction welding;

FIG. 3 is a view of the elements of FIG. 2 after friction welding;

FIG. 4 is an isometric view of a cast airfoil having openings in its interface surface;

FIG. 5 is a fragmentary, sectional view of the interface portion of a cast airfoil of the type shown in FIG. 4; and FIG. 6 is an isometric view of a plug for insertion in the interface portion of FIG. 5.

DESCRIPTION OF THE PREFERRED EMBODIMENTS

With present production gas turbine engines, such as those used to power aircraft, cast turbine blades have had adequate properties to meet design criteria: although certain properties of the cast base or dovetail portions are lower than those of the disc in which they are mounted, such properties have been adequate. The more improved cast high temperature superalloys, particularly of the nickel base or cobalt base type, have exhibited still further improved high temperature properties. However, such alloy developments have produced little or no increase in properties below about 1200°F for the same high temperature material. Concurrently, design of advanced engines with high tip speeds have resulted in dovetail stresses approaching the low cycle fatigue limit of the most advanced cast airfoil alloys.

In order to fulfill the design criteria for fluid directing elements of such turbomachinery, such as the turbine blades, it is advantageous to provide a method for making such a turbomachinery article having the desired high temperature properties in the airfoil portion and the desired lower temperature properties in the base portion which includes the shank and dovetail in many blades.

It has been found that use of a cast alloy for the airfoil and a wrought alloy for the base portion, when properly joined, can provide an improved structure.

Because of the high temperature operating conditions of the turbine of advanced gas turbine engines, and the operating temperature limitation of those superalloys based on elements in the group Ni, Co and Fe, it has been found necessary in virtually all advanced engines to circulate cooling fluid such as air through a hollow interior of a turbine blade or vane. The published art shows many such arrangements, including the use of baffles or inserts within hollow interior portions of such a member to channel or direct the flow of cooling fluid at appropriate points or areas within the airfoil interior. Thus the manufacture of a metallic article from a cast airfoil and a wrought base is further complicated by the requirement for inclusion within the hollow interior of such an insert or liner. In addition, it is necessary that such a method allow later removal of metal to provide passageways for cooling fluid to penetrate the hollow interior of the member.

As was indicated above, a high integrity joining process is necessary for producing a reliable, multicomponent article such as a turbine blade. There are a number of joining processes which are attractive for the manufacture of certain gas turbine engine components but are deficient in one manner or another for use in the manufacture of turbine blades.

Fusion welding is a versatile joining process which has been used to join many of the lower alloyed superalloys, particularly of the precipitation hardening nickel base type. However, attempts to weld advanced turbine blade cast alloys resulted in cracking, either during welding or after welding during post weld heat treatment. Thus, fusion welding is considered a high risk process for such application.

Brazing also is versatile. But brazed joints are too weak or too brittle, or both, for such critical applications.

Solid state diffusion bonding has been shown to be a highly efficient method for joining unweldable superalloys. However, the necessity of high bonding pressures at high temperatures restricts its use to simple configurations.

Friction welding is a solid state joining process which results in a forged, non-fusion welded bond and a narrow heat affected zone. It has none of the disadvantages of these processes referred to above and is capable of producing 100 percent efficient joints without compromise either in airfoil or base properties. The airfoil and the base can be manufactured separately thus eliminating such problems as are associated with incompatible heat treatments or application of coatings. It has been found that the friction welding of an airfoil, in one form cast to include a hollow interior portion or cast cored, with a wrought alloy base, each of such alloys selected from the superalloys based on Ni, Co or Fe, provides an article of high joint efficiency without affecting properties of individual components.

One example of a fluid directing element for turbomachinery, in accordance with the present invention, is shown diagrammatically in FIG. 1 as a turbine blade. Such a blade includes a cast alloy airfoil shown generally at 10 and a wrought alloy base, sometimes referred to as a dovetail, shown generally at 12. Frequently such a blading member includes a shank 14 which may be of a length dependent upon the design of the particular turbine in which the blade is to be used. As previously indicated, the airfoil can be a metal powder consolidation and the term "cast" as used herein is intended to include within its meaning such a powder metallurgical structure.

Included within the airfoil and shown diagrammatically in FIG. 1 is a liner insert 16 which communicates with a source of cooling fluid, such as air and represented by arrow 18, to direct such fluid against internal walls of the airfoil through appropriately positioned openings (not shown). Such cooling fluid can be circulated through the airfoil and discharged either through the base or through appropriately placed holes in the airfoil in the manner shown extensively in the art. Thus, such cooling and discharge holes are not shown in the drawing for simplicity.

The diagrammatic sectional view of FIG. 2 shows airfoil preform generally at 10a in spaced relationship with wrought metal base portion 12a. Preform 10a includes an enlarged foot 20 having a foot interface portion 22 including interface surface 24. Base portion 12a includes a base interface portion 26 having an interface surface 28.

After friction welding of preform 10a to base portion 12a at their respective interface portions 22 and 26, flash 30, shown in FIG. 3, is generated. However, interface surfaces 24 and 28 along with part of their adjacent interface portions have been friction welded into an integral, highly efficient bond. As will be shown later, such bond has unusually high strength properties.

Flash 30 can be removed in a variety of ways, including grinding or machining. Thereafter, base or dovetail 12, shank 14 and platform 32, shown in FIG. 1, can then be machined from base portion 12a and foot 20.

It should be understood that the method of the present invention can be practiced without the placement of a liner insert 16 within hollow airfoil preform 10a prior to friction welding. However, when such insert is applied, the friction welding of the airfoil preform to the base portion can secure the liner insert in position. This can eliminate the need for other means, such as brazing or mechanical devices, to hold the insert in position within the airfoil.

As shown in FIG. 1, frequently cooling fluid such as air is circulated through the airfoil from openings through the base. Such openings can be in the form of slots or various shaped passages or channels depending upon the amount of cooling fluid and its distribution required in the design of the blade. One problem which can occur through the friction welding of base portion 12a to an airfoil preform 10a including such passages or openings is the migration of flash into such passages. One form of the present invention provides a particularly shaped plug to be located in a recess provided in foot interface portion 22.

Referring to FIG. 4, there is represented, diagrammatically, airfoil preform 10a including passages 34 in foot interface portion 22. Passages 34 are connected with hollow interior 36 and open through foot interface surface 24 at opening 38.

In the practice of one form of the present invention, a recess shown generally at 40 in FIGS. 4 and 5 is provided around and connected with passage 34. FIG. 4 shows interface surface 24 after one recess has been provided in interface portion 22. The recess includes a bottom shelf 42 in FIG. 5 surrounding passage 34 in the interface portion 22 and is disposed in respect to passage wall 44 at shelf 42 at an angle no greater than about 90°. It has been found that if such angle is greater than about 90°, a plug, later to be inserted in recess 40, will shear the corner between shelf 42 and wall 44 allowing such plug to be driven into passage 34 and perhaps into the hollow interior 36 of the airfoil along with flash created during friction welding.

In the evaluation of this form of the present invention, passages 34 were blocked at openings 38 in a variety of ways. These included shrink fitting within the passage at opening 38 a cylindrical plug sized to match the passage and inserting a plug having a tapered head and cylindrical tip shaped to match passage 34. The taper of the head of such plug was at an angle of about 140° in respect to wall 44 of the passage and to its cylindrical tip. Airfoil members including such inserts were friction welded to wrought base portions. It was found that flash generated by such friction welding forced the cylindrical plugs further into passage 34 toward hollow interior 36, thus complicating further the flash removal problem. In respect to the tapered plugs, it was found that the flash tipped such plugs out of the openings and then penetrated passages 34.

Although the angle between shelf 42 and wall 44 is shown to be about a right angle, and such angle is conveniently produced both in the recess and in the plug to be inserted in the recess, it should be understood that recesses and their associated plugs having angles less than 90°, or of peripheral configurations other than circular or oval, can be used if desired.

One form of a plug which can be used in the practice of the present invention and which is shaped to match the recess, is shown generally at 46 in FIGS. 5 and 6, with the plug in FIG. 5 in position in recess 40. Such a plug includes a shank 48 and a head 50 attached to the shank and enlarged in respect to the shank. Head 50 includes a head top surface 52. Head 50 is shaped to match recess 40 and shank 48 is shaped to match passage 34 at wall 44. As shown in FIG. 5, plug 46 is designed so that its head top surface 52 is flush with interface surface 24 of foot interface portion 22.

As was mentioned before, plugs 46 effectively block flash 30 resulting from friction welding, from migrating into passage 34 and into hollow interior 36 of the blade airfoil. After friction welding, plugs 46, the material of which is appropriately selected to match the materials being joined, become part of the flash or friction welded area. Such material can be removed by a variety of material removal processes including electrochemical machining or drilling thus to provide the type of cooling fluid flow passages shown in FIG. 1 and open through base or dovetail 12.

This form of the present invention involving preplugging is conveniently used in connection with the friction welding of a dovetail or base to a cast, cored turbine blade including core support holes in the base of the airfoil. Such preplugging of the holes permits sound welds to be produced consistently over non-concentric holes.

As was indicated above, the friction welded joint, provided according to the method of the present invention, provides the article thus produced with a high quality joint of improved strength characteristics. For example, a casting made from a nickel base superalloy described in U.S. Pat. No. 3,615,376 — Ross, one form of which is referred to as Rene' 80 alloy, was joined with a wrought nickel base superalloy of the alloy described in U.S. Pat. No. 3,576,681 — Barker et al., one form of which is referred to as Rene' 95 alloy. The data of Tables I and II show the unusual strength characteristics of the welded joint compared with the parent metals.

TABLE I

| Specimen | Avg. 1200°F Stress Rupture Data | |
|---|---|---|
| | Stress (ksi) | Life (hrs) |
| Joint | 115 | 136 |
| | 120 | 97 |
| | 125 | 27 |
| Cast Alloy | 127 | 100 |
| Wrought Alloy* | 115 | 100 |

*Short, Transverse

TABLE II

| Specimen | Avg. 1200°F Tensile Data | | |
|---|---|---|---|
| | Ultimate Strength (ksi) | 0.2% Yield Strength (ksi) | Reduction in area (%) |
| Weld | 156 | 130 | 8.3 |
| Cast Alloy | 135 | 95 | 13.5 |

It should be noted in connection with the above tables, that in Table I failure occurred in the heat affected zone adjacent the weld and in Table II in the cast metal portion. Thus, failure did not occur in the weld line itself.

In addition to these data, room temperature Charpy impact testing of unnotched 0.300 inch diameter specimens showed an average impact energy in the range of 4.4 – 7.7 foot pounds for the friction welded joint compared with a 4.6 – 9 foot pound average for the cast base metal. Failure location in such impact testing was in the cast metal and not in the friction welded joint.

Those skilled in the art of metallurgy and friction welding will readily recognize from these embodiments and examples the variety of modifications and variations which can be included within the present invention without varying from its scope.

What is claimed is:

1. A metallic fluid directing element for turbomachinery apparatus comprising:
   an airfoil having a cast alloy structure; and
   a base having a wrought alloy structure;
   the airfoil and base being joined at a friction welded joint characterized by a solid state, forged structure with a narrow heat affected zone.

2. The article of claim 1 in which the airfoil includes a hollow interior portion.

3. The article of claim 2 in which a liner insert is positioned within the hollow interior portion.

4. The article of claim 1 in which both the airfoil and the base are of a high temperature operating superalloy based on an element selected from the group consisting of Ni, Co and Fe.

5. The article of claim 4 in which the alloy of the airfoil and of the base are based on the same element.

6. The article of claim 5 in which the element is Ni.

* * * * *